Figure 1:
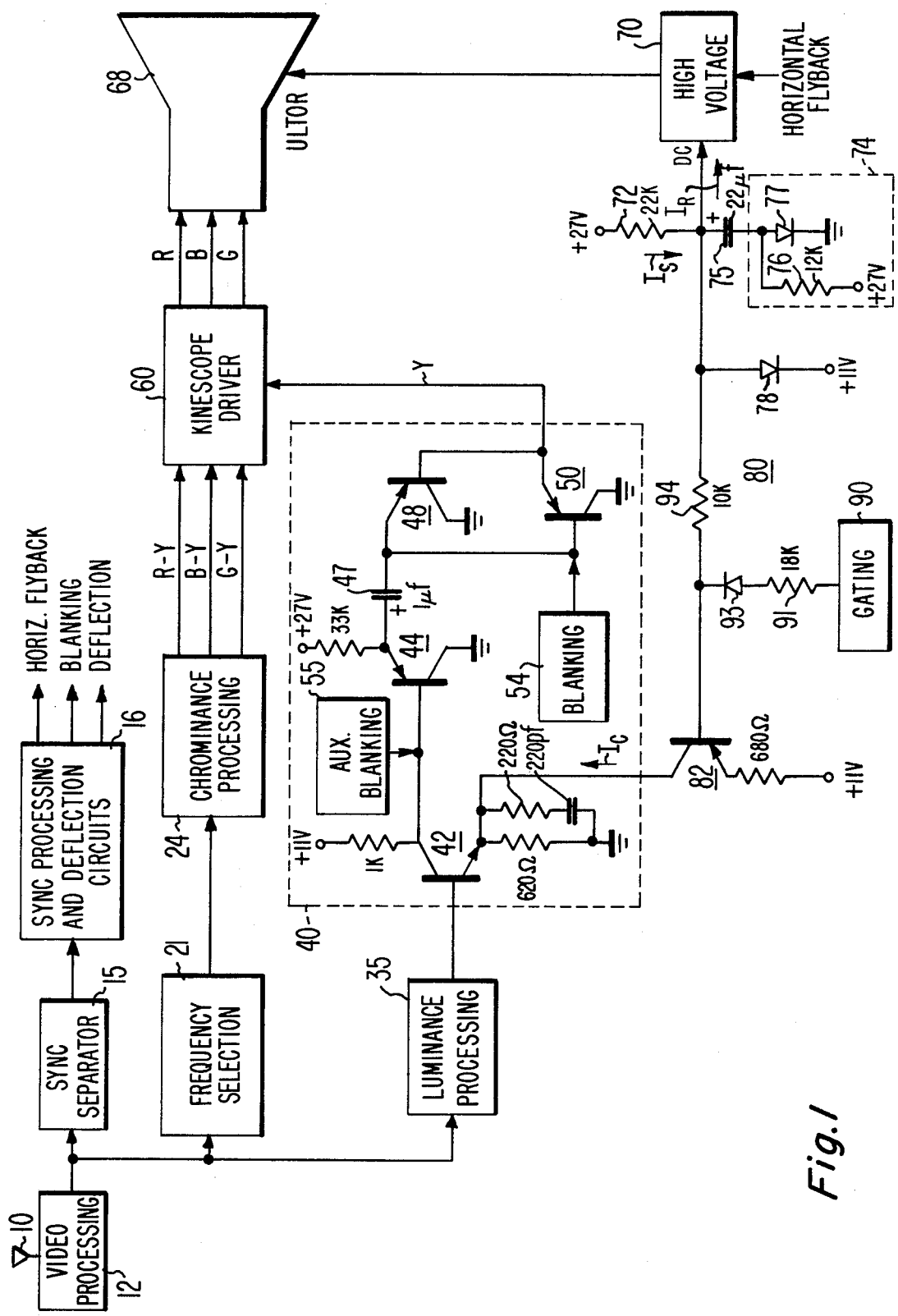

6/10/80

United States Patent [19]

Parker

[11] 4,207,591
[45] Jun. 10, 1980

[54] GATED AUTOMATIC BEAM CURRENT LIMITER IN A VIDEO SIGNAL PROCESSING SYSTEM

[75] Inventor: Robert P. Parker, Indianapolis, Ind.

[73] Assignee: RCA Corporation, New York, N.Y.

[21] Appl. No.: 876,235

[22] Filed: Feb. 9, 1978

[51] Int. Cl.² .................. H04N 5/16; H04N 9/16; H04N 5/68
[52] U.S. Cl. ...................... 358/34; 358/74; 358/243
[58] Field of Search .................. 358/243, 74, 39

[56] References Cited

U.S. PATENT DOCUMENTS

| | | | |
|---|---|---|---|
| 3,562,409 | 2/1971 | Freeman et al. | 358/69 |
| 3,735,029 | 5/1973 | Sunstein | 358/74 |
| 3,898,381 | 8/1973 | Amsen et al. | 358/243 |
| 4,067,048 | 1/1978 | Norman | 358/243 |
| 4,096,518 | 6/1978 | Tuma et al. | 358/243 X |

FOREIGN PATENT DOCUMENTS

| | | | |
|---|---|---|---|
| 1269388 | 4/1972 | United Kingdom | 358/34 |
| 1385944 | 3/1975 | United Kingdom | 358/34 |
| 1514220 | 6/1978 | United Kingdom | 358/74 |

*Primary Examiner*—Daryl W. Cook
*Assistant Examiner*—Aristotelis M. Psitos
*Attorney, Agent, or Firm*—Eugene M. Whitacre; William H. Meagher; Ronald H. Kurdyla

[57] ABSTRACT

In a video signal processing system including a clamp for clamping the video signal to a reference level during periodic image blanking intervals of the video signal, and a kinescope for reproducing an image in response to the clamped video signal, apparatus for automatically limiting excessive beam currents drawn by the kinescope. A derived control signal representative of the magnitude of excessive beam currents is applied to the video signal processing path prior to the clamp. The control signal is inhibited during the blanking intervals, and serves to offset the D.C. level of the video signal in the black direction during image trace intervals to reduce the current conduction of the kinescope.

14 Claims, 5 Drawing Figures

GATED AUTOMATIC BEAM CURRENT LIMITER IN A VIDEO SIGNAL PROCESSING SYSTEM

This invention relates to apparatus for automatically limiting excessive beam currents drawn by an image reproducing device in a video signal processing system such as a television receiver. In particular, the invention relates to such apparatus in a video signal processing system also including a keyed clamping circuit for restoring the D.C. level of the video signal to a reference level.

Excessive beam current can cause a television receiver to produce a degraded image. In this regard, excess beam currents can cause degradation of the performance of the receiver deflection system, electron beam spot defocusing and picture blooming. High beam currents can also exceed the safe operating current stability of the image reproducing kinescope, possibly damaging the kinescope and associated circuit components, such as the deflection circuits which may be sensitive to excess beam current levels.

Because of the nature of a composite television signal in which a reference blanking level occurs periodically, so-called keyed clamps are often employed in television receivers to conduct during intervals associated with the blanking level and thereby charge a coupling capacitor so as to restore or provide a reference D.C. component to a video signal coupled by the capacitor. The keyed clamp essentially serves to compensate for shifts in the D.C. level of the video signal, which can be caused by changes in the D.C. conditions of preceding signal processing circuits (e.g., due to temperature changes), and by tolerance variations from receiver to receiver.

A keyed clamp can be arranged in the luminance channel of the receiver for D.C. restoring a luminance signal component of the video signal. Such keyed clamping circuits are shown, for example, in U.S. Pat. No. 3,763,315 (M. N. Norman) and U.S. Pat. No. 3,927,255 (B. J. Yorkanis). A keyed clamping arrangement can also be advantageously employed in a kinescope driver stage for stabilizing the operating point and for establishing the blanking cut-off level of the driver stage. An arrangement of this type is described in U.S. Pat. No. 3,970,895 (D. H. Willis) and U.S. Pat. No. 3,959,811 (R. L. Shanley, II).

Keyed clamps employed for the purposes indicated above are typically disposed near the end of the video signal processing path in order to provide maximum effectiveness in compensating for changes in D.C. conditions, as mentioned. Since the blanking level of the video signal as established by the clamp approximates a black level of the video signal, varying the blanking level by varying the conduction of the clamp serves to alter the brightness of a reproduced image by altering the level of kinescope beam current conduction. Accordingly, beam current control can be advantageously provided by controlling the operation of the keyed clamp in response to the magnitude of excess beam current. An arrangement for providing beam current limiting in this manner is disclosed in copending U.S. patent application Ser. No. 715,861 of M. N. Norman, entitled "Automatic Beam Current Limiter" and assigned to the present assignee, now U.S. Pat. No. 4,067,048.

However, beam current control in this manner requires that the voltage across the coupling capacitor which is operatively associated with the clamp be changed in response to a control signal representative of the level of excess beam current. Since the voltage across a capacitor cannot be changed instantaneously, some delay will be experienced between the time that the control signal is generated and the time that kinescope current conduction is limited in response to the operation of clamp. Although this delay may be acceptable in some systems, it may be undersirable in other systems which require a rapid response to excess beam current conditions.

The beam current control signal can also be inserted in the video signal processing path after the clamping circuit. But this may be inconvenient or disadvantageous, depending upon the circuit arrangement in a particular case.

Apparatus according to the present invention is included in a video signal processing system having a video signal channel containing a video signal processing circuit. The circuit includes a charge storage device and serves to establish a reference level for the video signal during periodic image blanking intervals of the video signal. The system also comprises a kinescope for reproducing an image in response to processed video signals. The apparatus comprises a sensing circuit for deriving a signal indicative of the magnitude of current drawn by the kinescope in response to processed video signals, and a control network responsive to the derived signal. The control network provides an output control signal proportional to the amount by which the kinescope current exceeds a given threshold level. The control signal is inhibited during the blanking intervals, and is applied to the video channel for translating the video signal in a direction to limit kinescope current above the threshold level.

In the drawing:

FIG. 1 shows, partially in block diagram form and partially in schematic circuit diagram form, a general arrangement of a color television receiver employing apparatus constructed in accordance with the present invention; and FIGS. 2–5 depict signal waveforms useful in understanding the operation of the invention.

In FIG. 1, there is shown a color television receiver including a video signal processing unit 12 for receiving radio frequency signals from an antenna 10 and for translating these signals through intermediate frequency amplifying and detecting stages (not shown) to provide a composite video signal. The composite video signal contains luminance, chrominance, sound and synchronizing components.

A sync separator 15 serves to separate the synchronizing (sync) component from the composite video signal to provide periodic line sync pulses. These pulses are further processed by sync processing and deflection circuits 16 to provide horizontal flyback signals and horizontal and vertical blanking and deflection signals as known.

A frequency selection unit 21 (e.g., a bandpass filter) selectively couples the chrominance component of the composite video signal to a chrominance signal processing unit 24 (e.g., including amplifier and demodulator stages) to derive R-Y, B-Y and G-Y color difference signals. These signals are applied as inputs to a kinescope driver stage 60.

The luminance component of the composite video signal is amplified and otherwise processed by a luminance signal processing unit 35 in a luminance channel of the receiver. The luminance channel also includes a luminance signal processing circuit 40 as disclosed in my copending U.S. patent application Ser. No. 819,935, entitled "Combined Blanking Level And Kinescope Bias Clamp For A Television Signal Processing System", assigned to the same assignee as the present invention, now U.S. Pat. No. 4,110,787.

Luminance signals from unit 35 are amplified by a transistor 42 and coupled via a PNP follower transistor 44 to a keyed clamping network including a charge storage coupling capacitor 47 and a PNP keyed clamp transistor 48. Clamped luminance signals appearing at an emitter of transistor 48 are coupled to a base input of a PNP luminance driver transistor 50 arranged as an emitter follower. Transistors 48 and 50 are respectively rendered conductive and nonconductive during each retrace blanking interval of the video signal in response to positive periodic blanking pulses supplied during each blanking interval by a source of blanking pulses 54. Positive, periodic auxiliary blanking pulses of predetermined magnitude are added to the luminance signal at the base input of transistor 44 during each blanking interval. This and other aspects of circuit 40 are described in greater detail in my last mentioned U.S. patent application.

A clamped luminance signal Y appearing at an emitter output of transistor 50 is supplied to an input of kinescope driver 60, where the luminance signal is combined with the color difference signals from unit 24 to form R, B and G color signals. These signals are then coupled to signal inputs (e.g., cathode electrodes) of a kinescope 68 for reproducing a color image in response to these signals.

Figure 2:
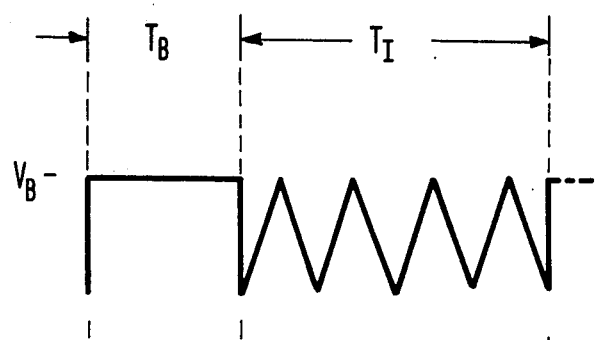

Under normal receiver operating conditions in the absence of excess beam currents, the clamped luminance signal Y coupled to kinescope driver stage 60 appears as shown in FIG. 2. The periodic luminance signal comprises a horizontal retrace blanking interval $T_B$ containing a sync stripped pedestal blanking level $V_B$, which approximates a black level of a reproduced image. Level $V_B$ is established by the clamping action of transistor 48 and associated capacitor 47 during this interval. The clamped luminance signal also comprises a horizontal image trace interval $T_I$ containing image information, the D.C. level of which is determinative of image brightness.

High operating voltages for focus (not shown) and ultor electrodes of kinescope 68 are provided by a high voltage supply 70 (e.g., a voltage tripler) in response to positive, periodic horizontal flyback pulses occurring during horizontal retrace scanning intervals. A current supply including a source of positive direct voltage (+27 volts) and a current determining resistor 72 provides a current $I_S$ and is coupled to a D.C. input of high voltage unit 70. Current flowing in resistor 72 includes a component $I_R$ representative of the beam current (i.e., ultor current) demand of the kinescope in response to the luminance and chrominance signals. This current flows into the D.C. input of high voltage unit 70 and is sometimes referred to as a "resupply" current (i.e., a current supplied via the high voltage unit to recharge or resupply the ultor electrode voltage of the kinescope when depleted as a result of current conduction).

Automatic beam current limiting is accomplished by a network 80 in response to excessive average beam current demand of kinescope 68. Network 80 comprises an average responding filter capacitor 75, a normally conductive clamp diode 78, and a control transistor 82 activated in the presence of excessive beam currents as manifested by the level of the resupply current. A control signal developed at a collector output of transistor 82 when conducting under conditions of excessive beam current serves to control the operation of transistor 42.

Network 80 also includes a source 90 of positive periodic gating pulses for rendering control transistor 82 nonconductive during each blanking interval, as will be discussed, and an auxiliary beam current sensing circuit 74. Auxiliary circuit 74 is operatively associated with the sensing circuit including capacitor 75 and resistor 72, and comprises a diode 77 biased by a reference current supplied from a current source including a resistor 76 and a source of positive D.C. potential (+27 volts). Circuit 74 permits beam limiter network 80 to respond rapidly to short duration or peak excess beam current levels, as described in detail in a copending, concurrently filed U.S. patent application Ser. No. 876,238 by D. H. Willis, entitled "Automatic Peak Beam Current Limiter", assigned to the present assignee.

For purposes of the discussion which immediately follows, it will be assumed that the terminal of filter capacitor 75 remote from resistor 72 is conductively coupled to ground via conductive diode 77.

The arrangement of control transistor 82, diode 78, capacitor 75, high voltage supply 70, and the current source comprising resistor 72 and the associated +27 volt source is of the type disclosed in the aforementioned copending U.S. patent application of M. N. Norman. Briefly, a voltage appearing on filter capacitor 75 is representative of the magnitude of average kinescope beam current demand when above a given threshold level. Below this level, in a normal operating condition, the voltage on capacitor 75 and the base voltage of control transistor 82 are clamped to a fixed level by means of normally conductive diode 78, such that transistor 82 is rendered nonconductive (i.e., reverse biased). When resupply current $I_R$ exceeds the threshold level, clamp diode 78 is rendered nonconductive and transistor 82 is forward biased into conduction in response to the voltage then appearing on capacitor 75. Transistor 82 then provides a collector output control signal proportional to the amount by which the threshold level is exceeded.

In the illustrated embodiment, in the normal operating mode conductive diode 78 clamps the voltage on capacitor 75 to +11 volts plus the voltage drop across diode 78 (approximately 0.6 volts), or +11.6 volts. Transistor 82 is reverse biased at this time. The value of resistor 72 and the voltage drop thereacross (15.4 volts) determine the normal level of current $I_S$ (0.7 milliamperes), which corresponds to the threshold level of beam limiter operation in this example. This current divides between diode 78 when conducting and the input of high voltage source 70 in accordance with the beam current demand of kinescope 68 as manifested by the level of resupply current $I_R$.

Neglecting the role of gating unit 90 for the moment, when the level of resupply current $I_R$ exceeds the level of current $I_S$ under conditions of excessive beam current demand, current drive for diode 78 is depleted and diode 78 is rendered nonconductive. The voltage on capacitor 75 then decreases to a less positive level sufficient to forward bias control transistor 82 into conduction.

Transistor 82 then develops a collector current $I_C$ proportional to the amount by which the threshold level of beam current is exceeded. This current flows in the emitter circuit of video amplifier transistor 42, and serves to alter the D.C. operating condition of transistor 42 by altering the bias of transistor 42, such that the D.C. content of the luminance signal processed by transistor 42 is altered in a direction to cause kinescope 68 to conduct proportionally less beam current.

Specifically, control current $I_C$ produced by transistor 82 in the beam current limiting mode causes the D.C. level of the luminance signal to be offset in the black direction, thereby reducing image brightness and limiting kinescope beam current conduction above the threshold level. It is noted that in this instance the control current from transistor 82 is utilized to control the luminance signal immediately prior to clamping. However, in order that the effect of the control signal is not impaired or obscured by the clamping action of transistor 48, it is necessary to inhibit the control signal during the retrace blanking intervals during which clamp transistor 48 is rendered operative. This is accomplished by a gating network including the source of gating signals 90, resistor 91, isolation diode 93 and resistor 94.

Figure 3:
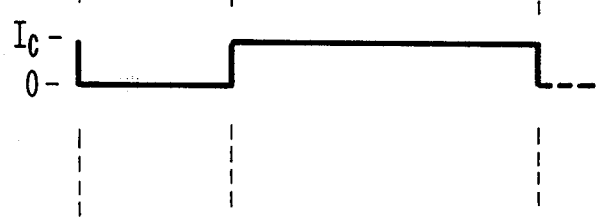

The positive, periodic gating signal provided by source 90 during each blanking interval (see FIG. 5) renders control transistor 82 nonconductive during this time. Accordingly, control current $I_C$ otherwise provided by transistor 82 is inhibited during each retrace blanking interval, as indicated by the waveform of FIG. 3. The magnitude of the gating signals during the image trace interval is such that the conduction of transistor 82 is not impeded in the beam limiting mode.

Figure 4:
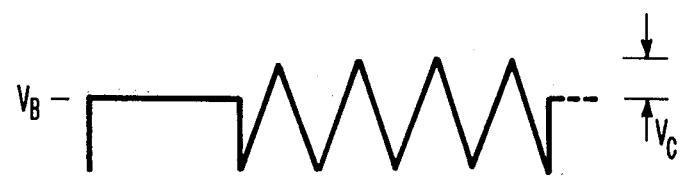
Figure 5:
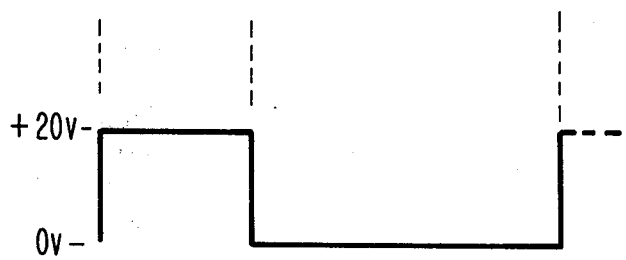

The clamped luminance signal Y appearing during the beam limiting mode is shown in FIG. 4. It is noted that the luminance signal is shifted or offset in a positive, black direction during the image trace interval by an amount $V_C$ in response to current $I_C$. Accordingly, the D.C. level of the luminance signal during this interval is shifted by the same amount in the same direction. In this example, the positive peak of the luminance signal during the trace interval is shifted in a "blacker-than-black" direction, above blanking level $V_B$. The offset amount $V_C$ is proportional to the level of control current $I_C$ (FIG. 3), and is therefore proportional to the amount of excess beam current. The shifted D.C. level of the luminance signal during the trace interval causes a reduction in image brightness and limits kinescope beam currents to the threshold level.

As mentioned earlier, the luminance clamp circuit is a convenient place at which to effect beam current control, except that the speed of beam current control is limited by the rate at which the charge on the clamp capacitor can be changed. The beam limiter arrangement of FIG. 1, wherein the luminance signal is offset in the black direction only during the horizontal trace interval in response to the control signal, is not limited in speed of response by the rate at which the charge on the clamp capacitor can be changed. The speed of response of the disclosed beam limiter arrangement is a function of the speed of the beam current sensing circuits employed in a particular case (e.g., resistor 72, capacitor 75 and diode 78 in FIG. 1), which can be made acceptably fast, rather than a function of the speed of the luminance clamp.

By deleting the luminance signal offset ($V_C$ in FIG. 4) during each retrace interval, the operation of the luminance clamp is unaffected during the beam limiting mode. The blanking level $V_B$ of the luminance signal therefore remains unchanged, since the luminance signal is not controlled in response to control current $I_C$ during the retrace blanking interval. In addition, the beam limiting control signal is unaffected by the action of the clamp, which would otherwise attempt to clamp the luminance signal during blanking intervals in a direction to negate the control signal, and thereby degrade beam limiting action.

Referring now to sensing circuit 74, diode 77 is rendered nonconductive and capacitor 75 is thereby decoupled from ground when the level of resupply current $I_R$ exceeds the reference current which is established by resistor 76 and which otherwise flows through diode 77. This condition can arise in the presence of excessive short duration or peak beam current demand. In this event the peak beam current is limited as a consequence of capacitor 75 being decoupled from ground, since the voltage then developed at the positive terminal of capacitor 75 and appearing at the base of transistor 82 tracks closely with the peak beam current demand. Peak beam current limiting is then accomplished in response to the collector control signal provided by transistor 82, which otherwise operates as discussed. More specific details of the operation of sensing circuit 74 are found in the copending U.S. patent application of D. H. Willis mentioned earlier.

Other arrangements for sensing and limiting peak beam currents are known. For example, a copending U.S. patent application Ser. No. 766,373 of J. J. Serafini entitled "Automatic Transient Beam Current Limiter", now U.S. Pat. No. 4,079,424 discloses apparatus for deriving a control signal representative of excessive short duration, peak or transient beam currents. This control signal can be utilized to accomplish beam current limiting by controlling transistor 82 in FIG. 1.

Any significant delay between the time the control signal is generated and the time beam current limiting is commenced in response to the control signal will compromise the effectiveness of a beam current limiter including a rapid responding sensing circuit (i.e., responsive to short duration or peak beam currents). Such delay is minimized in accordance with the present invention in a system including a luminance clamping circuit or equivalent circuit which represents a source of such delay.

The delay can be attributable to the operating characteristics of a charge storage coupling capacitor (e.g., 47 in FIG. 1) associated with a luminance clamp network, or to a charge storage capacitor associated with a sample and hold signal processing circuit. A circuit of this type employed in the luminance channel of a video signal processing system for automatic brightness control purposes is described in a copending U.S. patent application Ser. No. 794,128 of A. V. Tuma, et al., entitled "Brightness Control Circuit Employing A Closed Control Loop."

While the invention has been described in terms of a preferred embodiment, it should be recognized that various modifications can be made by persons skilled in the art without departing from the scope of the invention. Component values and other examples of operating parameters have been mentioned as an aid to understanding the invention and are not intended to be limiting.

A circuit in accordance with the present invention need not be arranged in the luminance channel of a video signal processing system, but can be operatively associated with kinescope driver stages of the type disclosed in U.S. Pat. No. 3,970,895 of D. H. Willis. As described in greater detail in that patent, each driver stage incorporates a keyed clamping transistor preceding and arranged in feedback relation with a matrix amplifier transistor supplied at a base input with A.C. coupled color difference signals, and supplied at an emitter input with luminance signals. The A.C. coupling is provided by coupling capacitors each also being operatively associated with the clamp transistors. With such an arrangement, beam current limiting with attendant brightness limiting can be accomplished by applying the gated control signal from the collector of control transistor 82 (FIG. 1) to each color difference signal coupling path prior to each A.C. coupling capacitor.

Beam limiting control in accordance with the present invention is also advantageous in a system wherein it is desired that the blanking reference level (e.g., as provided by the luminance clamp) remain unaffected by the beam limiter control signal. Illustratively, a gated beam limiter control signal developed in the manner described can be inserted between the luminance clamp and a kinescope driver employing keyed clamping stages of the type described in U.S. Pat. No. 3,970,895. Since these keyed clamping driver stages are arranged to clamp chrominance signals processed by these stages to a reference level during each blanking interval, it is desirable to maintain the blanking reference level undisturbed.

What is claimed is:

1. In a video signal processing system comprising a video signal processing channel containing means for establishing a reference level for said video signal during periodic image blanking intervals separating image information intervals of said video signal, said reference level establishing means including charge storage means, and said system also comprising means for reproducing an image in response to processed video signals, apparatus comprising:
    means for deriving a signal representative of the magnitude of current drawn by said image reproducing means in response to signal image information occurring during said image intervals of processed video signals;
    control means responsive to said derived signal for providing an output control signal when said current exceeds a predetermined threshold level, said control signal being proportional to the amount by which said threshold level is exceeded;
    means for coupling said control signal to said channel for translating said video signal in a direction to limit said current above said threshold level; and
    means for inhibiting said control signal during said blanking intervals.

2. Apparatus according to claim 1, wherein:
    said control signal is coupled to said video signal channel prior to said reference level establishing means.

3. Apparatus according to claim 2, wherein:
    said signal deriving means responds to the magnitude of average current drawn by said image reproducing means in response to said video signals; and
    said control signal is coupled to said channel for translating the D.C. level of said video signal in a direction to limit said current.

4. Apparatus according to claim 2, wherein:
    said signal deriving means responds to the magnitude of peak current drawn by said image reproducing means in response to said video signals.

5. Apparatus according to claim 2, wherein said reference level establishing means comprises clamping means including:
    a source of periodic blanking pulses coincident with said blanking intervals;
    and semiconductor means coupled to said charge storage means and responsive to said blanking pulses for providing said reference level during said blanking intervals.

6. Apparatus according to claim 5, wherein:
    said control means comprises a controllable conduction device exhibiting a first conductive condition during normal operating conditions of said system, and a second conductive condition in response to said derived signal when said current exceeds said threshold level; and
    said means for inhibiting said control signal is coupled to said controllable conduction device for inhibiting the operation thereof during said blanking intervals.

7. Apparatus according to claim 6, wherein:
    said inhibiting means comprises a source of periodic pulses coincident with said blanking intervals.

8. Apparatus according to claim 1, wherein said system further includes:
    high voltage supplying means providing an operating supply for said image reproducing means; and wherein
    said signal deriving means derives a signal representative of the magnitude of current drawn by said image reproducing means from said high voltage means.

9. Apparatus according to claim 8, wherein said signal deriving means includes:
    a source of current coupled to an input of said high voltage supplying means for supplying thereto operating currents representative of the current demand of said image reproducing means; and
    means for sensing the magnitude of said operating currents supplied to said high voltage means.

10. In a system for processing a television signal containing an image representative luminance component, a luminance signal processing channel comprising means, including capacitive means, for clamping said luminance signal to a reference level during periodic image blanking intervals separating image information intervals of said luminance signal, and means for reproducing an image in response to said clamped luminance signal, apparatus comprising:
    means for deriving a signal representative of the magnitude of current drawn by said image reproducing means in response to signal image information occurring during image intervals of said clamped luminance signal;
    control means responsive to said derived signal for providing an output control signal when said current exceeds a predetermined threshold level, said control signal being proportional to the amount by which said threshold level is exceeded;
    means for coupling said control signal to said luminance channel for translating said luminance signal in a direction to limit said current above said threshold level; and
    means for inhibiting said control signal during said blanking intervals.

11. Apparatus according to claim 10, wherein:
    said control signal is coupled to said luminance channel at a point prior to said clamping means.

12. In a color television signal processing system comprising a color television signal processing path including means for clamping said television signal to a reference level during periodic image blanking intervals separating image information intervals of said television signal, and means for reproducing an image in response to said clamped television signal, apparatus comprising:
- means for deriving a signal representative of the magnitude of current drawn by said image reproducing means in response to signal image information occurring during image intervals of said clamped television signal;
- control means responsive to said derived signal for providing an output control signal when said current exceeds a predetermined threshold level, said control signal being proportional to the amount by which said threshold level is exceeded;
- means for coupling said control signal to said signal processing path for translating said television signal in a direction to limit said current above said threshold level; and
- means for inhibiting said control signal during said blanking intervals.

13. Apparatus according to claim 12, wherein:
- said television signal comprises image representative luminance and chrominance components;
- said signal processing path comprises luminance and chrominance signal processing channels;
- said clamping means is disposed in one of said channels for clamping signals processed by said one channel; and
- said control signal is coupled to a point in said one channel prior to said clamping means for translating signals processed by said one channel in a direction to limit said current above said threshold level.

14. Apparatus according to claim 13, wherein:
- said clamping means is disposed in said luminance channel for clamping said luminance component; and
- said control signal is coupled to a point in said luminance channel prior to said clamping means for translating said luminance component.

* * * * *